Figure 1:
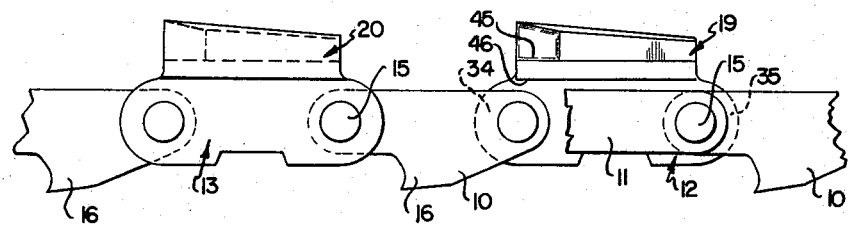

Oct. 24, 1967  H. L. GRUNEWALD  3,348,590

CHAIN SAWS

Filed Dec. 21, 1964  2 Sheets-Sheet 1

INVENTOR
HENRY L. GRUNEWALD
BY
Fetherstonhaugh & Co.
ATTORNEYS

Oct. 24, 1967  H. L. GRUNEWALD  3,348,590
CHAIN SAWS
Filed Dec. 21, 1964  2 Sheets-Sheet 2
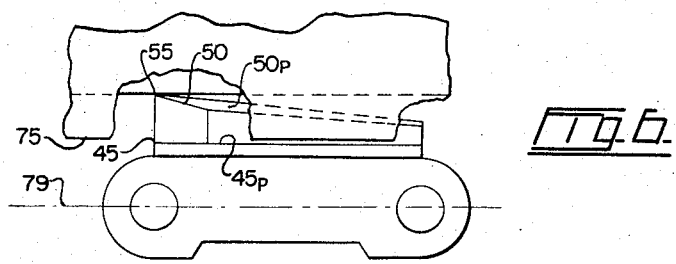
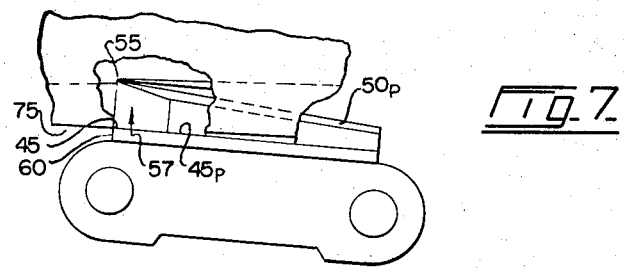
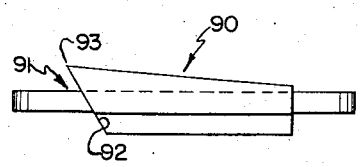
INVENTOR
HENRY L. GRUNEWALD
BY
*Fetherstonhaugh & Co.*
ATTORNEYS

United States Patent Office 3,348,590
Patented Oct. 24, 1967

3,348,590
CHAIN SAWS
Henry L. Grunewald, Prince George, British Columbia, Canada, assignor of one-half to Roderick R. H. MacLeod, North Surrey, British Columbia, Canada
Filed Dec. 21, 1964, Ser. No. 419,635
7 Claims. (Cl. 143—135)

This invention relates to power operated chain saws, and more particularly to the formation and location of the cutter teeth forming a part of the saw chain.

In the construction of saw chains, the form and location of the cutting teeth thereof has been a subject which has prompted the development of many and varied forms, each form having different characteristics calculated to improve the efficiency of the saw. Some of the forms hereinbefore developed have resulted in cutter teeth which cut centrally of the kerf in following succession, while others are designed to cut on one side of the bottom of the kerf in overlapping right and left succession. In most cutter teeth, depth control devices are employed whereby the cutting action of each of the teeth can be regulated to cut to a depth most efficient for that type of tooth.

The depth regulatory devices commonly employed are such that the cutting teeth associated therewith all cut at a constant regulated depth regardless of the density of the wood which is being sawn. It is apparent therefore that the driving force necessary to make a cut in dense wood would of necessity be greater than when the cut is to be made in wood of a less dense nature and which thereby offers a greatly decreased resistance to the action of the saw. In most cases, therefore, where the resistance of the wood to cutting is high, the motor driving the chain must work to full capacity, thereby straining both the motor and the chain, while in other cases where the wood offers very little resistance to cutting, neither the chain nor the motor are required to work to their designed capacity. The chain saw, in which the shape of the cutting teeth results in a variation in the power output of the driving motor in order to cut through different types of wood, will hardly ever operate at maximum efficiency.

Another and equally efficiency-reducing feature of most saw chains is the tendency of the individual teeth thereof to wander laterally in the kerf, thereby frequently cutting a wider kerf than is necessary. The widening of the kerf may take place on one side or the other thereof, resulting in an undesired sinuosity which, consequently, results in increased friction of the chain with the walls of the kerf and vibration of the chain where chain speeds are high. This feature of chain saws is largely due to the fact that the individual cutting teeth thereof are provided with no lateral guidance. A piece of timber is rarely of equal density throughout due to the presence of knots and the like and thereby offers, throughout the length of the kerf, varied degrees of resistance to cutting. As each link of the chain is capable of some lateral deflection and, as in fact each link carrying a cutting tooth may tend to deflect slightly from the pitch line of the chain or from the median plane of the chain saw, the variations of the wood throughout the length of the kerf and the consequent variation in its resistance to being cut results in continual variation of the deflection of each of the cutting teeth as it travels from one end of the kerf to the other.

The saw chain, in accordance with the present invention, seeks to overcome the aforementioned efficiency-reducing features by providing cutter teeth for the saw which are not only self-regulating respecting the depth of cut of each, but in which the depth regulation automatically varies relative to the nature of the wood in which the cut is made and, furthermore, provides lateral guidance for each of the cutter teeth to minimize or eliminate the tendetncy of the saw chain to wander laterally when making a cut through a body of wood of varied density throughout the length of the kerf.

The present invention comprises a cutter tooth for a saw chain, a shank and chisel connected thereto, the latter being arranged in alternate right and left-hand disposition and having primary cutting edges formed to cut alternately on opposite sides of the median plane of the saw, said cutting edges being spaced outwardly of said median plane to form a tongue extetnding centrally of the kerf between said chisels, each of said chisels having a secondary cutting edge adapted to cut the outer edge of the tongue as the primary cutting edges pare the bottom of the kerf, and elongated guide means extending in a force and aft direction parallel to said median plane adapted to slidably coact with a side of said tongue adjacent the former's associated chisel to maintain each chisel in longitudinal alignment with the chisels in right or left hand association therewith.

Figure 2:
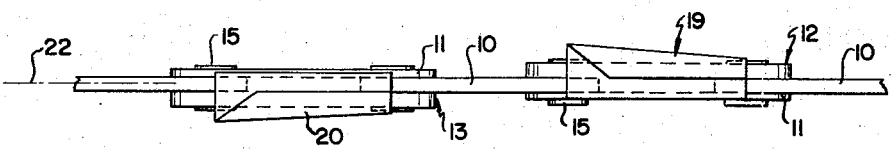
Figure 3:
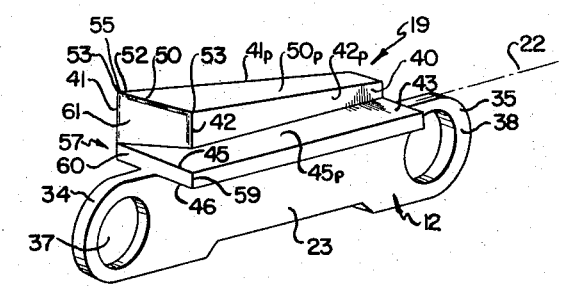
Figure 4:
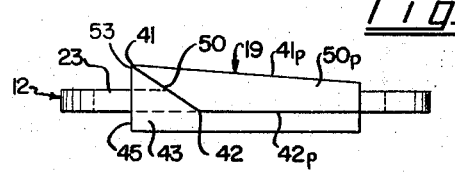
Figure 5:
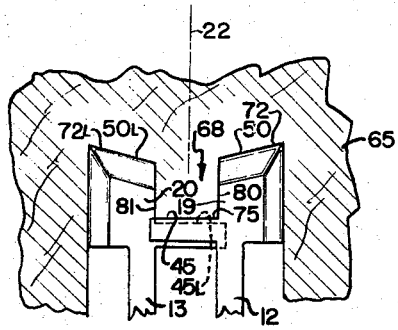

In the drawings which illustrate the embodiments of the invention,

FIGURE 1 is a side elevation of a portion of a saw chain constructed in accordance with one form of the present invention, FIGURE 2 is a top plan view of the chain of FIGURE 1, FIGURE 3 is a view in perspective of a cutter tooth and link incorporated in the saw chain of FIGURE 1, FIGURE 4 is an enlarged top plan view of a cutter tooth of FIGURE 3, FIGURE 5 is an enlarged rear elevation showing a pair of successive cutter teeth in operative positions in the work, FIGURE 6 is an enlarged side elevation of a portion of the saw chain of FIGURE 1, showing the disposition of the links and cutting teeth thereof when the latter are not engaged in the work, FIGURE 7 is an enlarged side elevation of a portion of the saw chain of FIGURE 1, showing the disposition of the links and cutting teeth thereof when the latter are engaged in the work, and FIGURE 8 illustrates an alternate embodiment of the invention.

Referring to the drawings and particularly to FIGURES 1 and 2 thereof, the saw chain of the invention comprises a plurality of centrally disposed longitudinally spaced apart drive links 10, side links 11, and alternate right and left-hand cutter links 12 and 13, respectively. The side links 11 and right and left-hand cutter links 12 and 13, respectively, are pivotally secured by means of rivets 15 to the drive links 10, the latter being provided with a depending sprocket engaging root 16 which is adapted to slide within the peripheral groove of the cutter bar, not shown.

The right and left-hand cutter links 12 and 13, respectively, are each provided with corresponding right and left-hand cutter teeth 19 and 20, respectively, the links thereof serving as shanks for said cutter teeth. This arrangement, therefore, provides a series of cutter teeth alternately positioned on either side of the median plane 22 of the saw chain, the latter corresponding to the centre line of the drive links 10. The cutter teeth 19 and 20 are identical as to their design and operation, differing only in that they are counterposed and, as they are spaced equidistantly on either side of the median line 22, make identical but counterposed cuts. In the description following therefor, only one of said cutter teeth will be described in detail.

With reference to FIGURES 3 and 4 of the drawings, the cutter link and cutter tooth therein disclosed are right-handed link 12 and tooth 19, respectively. The link is formed having a flat body portion 23 which serves as a shank for the tooth 19, having rounded fore and aft ends 34 and 35, respectively, in which circular apertures 37 and 38, respectively, are formed to receive the rivets 15. The tooth or chisel 19 is elongated in a fore and aft direction and has a thick substantially L-shaped transverse cross section throughout, one leg 40 thereof being substantially vertical having outer and inner edges 41 and 42, and an upper edge 50, and the other leg 43 extending from said inner edge transversely across said medial line, said transverse leg having upper 45 and lower 46 edges extending horizontally and an inner side edge 59 extending vertically, when viewed in the transverse plane, whereas the upper edge 50 of the vertical leg, when the latter is viewed in the transverse plane, slopes downwardly from the upper end 52 of its outer edge 41 to the upper end 53 of its inner edge 42. The intersection, therefore, of its upper edge 50 and its outer edge 41 forms a tip 55 having an acute internal angle, when viewed in the transverse plane, said tip being the point furthest removed from the pitch line of the chain.

The forward face 57 of the cutter tooth 19, as defined by outer and inner edges 41 and 42 of the vertical leg 40, the upper and lower edges 45 and 46 of the transverse leg 43, the upper edge 50 of said vertical leg and the side edge 59 of the transverse leg is substantially vertical. That portion 60 thereof extending between the outer edge 41 of the vertical leg and the side edge 59 of the transverse leg extends transversely to the longitudinal axis of the tooth, whereas that portion 61 of said forward face extending between said outer edge 41 and the inner edge 42 of said vertical leg is bevelled so that the outer edge 41 becomes the leading edge of the tooth.

The sides of the tooth as defined by the edges of its forward face 57, when viewed in the transverse plane, extend rearwardly from its edges as flat planar surfaces, each being designated by the numeral accorded its forward edge and followed by the suffix p. Planar surface 41p which, when the tooth is working in the wood, confronts a side wall of the kerf, slopes rearwardly and inwardly toward the medial line 22 from said edge 41, and planar surface 50p slopes rearwardly and downwardly towards the pitch line, as indicated clearly in FIGURES 3 and 6, respectively, and provides a clearance of the elongated tooth within the kerf of said planar surfaces so that only the forward edges 42, 41 and 50 contact the wood. Both last-mentioned edges are cutting edges and, as mentioned hereinbefore, said outer edge 41 confronts one wall of the kerf while cutting edge 50 confronts a portion of the right-hand side of the bottom thereof. Planar surface 42p, on the other hand, extends parallel to the medial plane of the saw chain and the longitudinal axis of planar surface 45p extends parallel to the pitch line of each individual link. It must also be mentioned that upper edge 45 of the transverse leg 43 functions as a cutting edge as hereinafter described. However, it is obvious that inner edge 42 of the vertical leg 40 by reason of the obtuse angle formed by the intersection of planar surface 42p and that section 61 of the forward face 57 is not a slicing or paring edge.

The relative dimensions and positions assumed by alternate left and right cutter teeth 19 and 20, respectively, may be best described with reference to FIGURES 5 and 6. In FIGURE 5, a pair of right-hand and left-hand cutter teeth 19 and 20, respectively, are shown engaged in making a cut in a piece of wood indicated by the number 65. In this figure, the elements of cutter tooth 20 corresponding to similar elements of cutter tooth 19, are each accorded the same numeral as the latter, followed however by the suffix L. It will be seen that the edge 50 of tooth 19 extends from the right-hand wall of the kerf towards the medial line 22, but terminates short thereof. Similarly, free edge 50L of cutter tooth 20 also terminates short of said medial line, thereby leaving an uncut portion or tongue 68 extending centrally from the bottom of the kerf. The cutting edges 45 and 45L, however, each extend beyond the opposite sides of the tongue 68 as the latter is formed. As the cutting edges 50 and 50L each cut their respective bottom portions 72 and 72L of the kerf, the cutting edges 45 and 45L each cut the outer or free end 75 of the tongue and, as the respective vertical spacing between said cutting edges on each cutter tooth remains constant, the relative depth of cut made by cutting edges corresponding to edges 45 and 50 on a single tooth, also remains constant. It is this last-mentioned factor which provides the cutting depth control hereinbefore mentioned and as explained as follows.

Referring to FIGURE 6 in which is shown the chain and cutter teeth at rest or, in other words, in the position assumed when the cutter teeth thereof are not engaged in cutting the wood, it will be seen that planar surface 45p extends longitudinally parallel to the ideal pitch line 79 of the chain, whereas the planar surface 50p slopes rearwardly from cutting edge 50 away from the wood. In this position it will be seen that the cutting edge 45 cannot engage the wood and therefore cannot cut the free end 75 of the tongue. However, when the saw chain is set in motion to commence cutting, the resistance offered to each cutting tooth by the engagement of the tip 55 and cutting edges 41 and 45, will tilt the tooth rearwardly into a position as shown in FIGURE 7. The tilting or change in inclination of the cutting tooth is common to all chain saws as the cutting links are pivotally connected to the drive links 10, and a chain always has a certain, however, minimal slackness on the cutter bar. The tilting of the tooth will result therefore in the planar surface 45p assuming an inclined position respecting the longitudinal edge of the free end 75 of the tongue so that only the edge 45 may come in contact with the said free edge end 75. However, as planar surface 50p is reardwardly inclined when the chain is in its at rest position, its degree of inclination to the bottom of the kerf when the link associated therewith tilts rearwardly, will be greater than the degree of inclination of said planar surface 45p to the edge 45 of the tongue. It is obvious, therefore, that the cutting edge 50 will have a tendency to try to cut deeper than cutting edge 45. However, due to the unvarying spacing of the two, the depth of cut made by each must be equal. It will be obvious, therefore, that the depth of cut of each of the cutter teeth is controlled, in turn, by each of their respective edges corresponding to cutting edge 45 of cutter tooth 19. Furthermore, as cutting edge 45 is more wedge-shaped than knife like, the internal angle between portion 60 of the forward face 57 and planar surface 45p being substantially 90°, the cutting action of said last-mentioned edge against the free end 75 of the tongue has more of a tearing and wearing quality, whereas the chisel like shape of edge 50 provides said edge with more of a slicing or paring quality. Thus, where the cutter tooth meets a dense section of wood in which the fibres are densely packed, the depth of cut made would be much less than where the wood is relatively soft, thereby preventing the cutting edge 50 from taking too large a bite into the denser wood and conversely permitting it to take a much larger bite in softer wood, thereby equalizing the strain upon teeth which may be simultaneously engaged in the work.

In the foregoing description, reference has been made to each cutter tooth having a substantially vertical face. However, this face may be sloped rearwardly from each of the cutting edges proveded, however, that the slope of the face adjacent cutting edge 45 is not so great that said cutting edge will tend to dig into the wood rather than wear or tear the latter in the manner hereinbefore specified. It has been found that the slope of face adjoining the cutting edge 45 should not be such that the internal angle between said face and planar surface 45 is any less acute than 88°.

As previously noted, the saw chain constructed in accordance with the present invention minimizes, if not completely eliminates, the tendency of the chain to wander laterally of the kerf. Referring to FIGURE 4, it will be seen that cutting edge 50 terminates at its inner end 53 in the leading edge 42 of planar surface 42p. The latter planar surface which extends parallel to the medium line 22 will therefore lie proximate to and slidably bear on a side wall 80 of the tongue 68. Likewise, the corresponding planar surface 42L of the left-hand cutter tooth 20 will lie proximate to and slidably bear on the opposite wall 81 of said tongue, so that any tendency for one of the cutter teeth to pull away from one side of the tongue, will be resisted by the cutter teeth preceding it and following it on the other side of the tongue. The cutter teeth, therefore, in each of the left and right-hand series will follow one another in an alignment parallel to the medial line of the saw chain, thereby maintaining a constant width kerf free of any sinuosity.

In order to reduce the tendency of the cutter teeth to wander laterally aside from the guiding action obtained through the contact of the tooth with the tongue as described in the foregoing paragraph, each tooth is located centrally of the link to which it is connected. This may be best described with reference to FIGURE 4 of the drawings. It will be seen that the tooth 19 is disposed relative to the link 12 so that the cutting edge 45 is centrally located transversely of the tooth so that the combined reactive forces of said edge 45 and edges 41 and 50, lie substantially coincident with the longitudinal axis of the cutter link 12. Although the reactive forces may not be evenly balanced owing to the rearwardly bevelled edge 50, the direction of the drag on the cutter link 12 will be substantially along its longitudinal axis which therefore tends to induce it to follow in true alignment with the connecting links 10.

FIGURE 8 illustrates another embodiment 90 of a cutter tooth. Cutter tooth 90 is identical in every respect to cutter tooth 19, differing only in its forward face identified by the numeral 91. The whole of said forward face of cutter tooth 90 is beveled at the same angle throughout from the edge 93 thereof, said edge corresponding to edge 41 of cutter tooth 19. This bevel also results in the edge 92, the latter corresponding to edge 45 of tooth 19, extending obliquely rather than transversely to the longitudinal axis of the saw chain, a feature which adds a slicing quality to said edge 92 and thereby increases its cutting action. This latter type of tooth will normally take a deeper cut than a tooth constructed in the manner of tooth 19, and may be used in relatively heavy chain saws having powerful motors.

What I claim as my invention is:

1. A saw chain comprising fore and aft elongated right and left L-shaped cutter teeth, each tooth having a vertical leg having upper, outer and inner cutting edges at its forward end, said vertical legs of the teeth being spaced outwardly on opposite sides of the medial plane of the chain so that said vertical legs cut spaced apart grooves in wood as the saw chain is drawn therethrough leaving an elongated tongue of wood between the grooves, each of said teeth having a horizontal leg extending inwardly over said medial plane, said horizontal legs having forward transverse cutting edges to cut the outer edge of the tongue.

2. A saw chain as claimed in claim 1 wherein the upper cutting edge of the vertical leg of each tooth defines the leading end of a planar surface sloping rearwardly towards the pitch line of the chain and said transverse cutting edge of said horizontal leg defines the leading end of a planar surface extending substantially parallel to the pitch line of the chain.

3. A saw chain as claimed in claim 1 wherein the inner cutting edge of the vertical leg of each tooth defines the leading end of a planar surface extending in planar parallelism with the medial plane of the saw chain.

4. A saw chain as claimed in claim 1 in which the forward end of the vertical leg of each tooth is bevelled inwardly so that the outer edge of the vertical leg forms the leading edge thereof.

5. A saw chain as claimed in claim 1 in which the outer cutting edge of the vertical leg of each tooth defines the leading end of a planar surface inclined laterally towards the medial plane of the chain.

6. A cutter tooth unit for a saw chain having right and left cutter teeth comprising an elongated fore and aft extending shank having a chain rivet receiving hole formed adjacent each of its ends, a fore and aft elongated L-shaped chisel connected to the shank, said chisel having a horizontal leg and a vertical leg upstanding from a side edge of said horizontal leg, said horizontal leg and vertical leg having forward cutting edges to cut an L-shaped groove in wood through which said unit is drawn, the cutting edge of said horizontal leg extending transversely thereof and defining the leading end of an elongated planar surface the fore and aft axis of which extend substantially parallel to a line extended through the center of said rivet holes and one of the cutting edges of said vertical leg constituting the upper forward end of the latter, said last-mentioned cutting edge defining the leading end of an elongated planar surface sloping rearwardly towards said line, said transverse cutting edge of the horizontal leg and said one cutting edge of the vertical leg defining the upper ends of forward planar surfaces, said forward planar surfaces being arranged so that the included angle between the forward planar surface of the vertical leg and the planar surface extending rearwardly from said upper cutting edge is more acute than the included angle between the forward planar surface of the horizontal leg and the planar surface extending rearwardly from the transverse cutting edge of the latter leg.

7. A cutter tooth unit as claimed in claim 6 wherein the forward planar surface of the horizontal leg extends substantially at right angles to the planar surface extending rearwardly from the transverse cutting edge of said horizontal leg.

References Cited

UNITED STATES PATENTS

| 2,564,989 | 8/1951 | Ohman | 143—135 |
| 3,106,232 | 10/1963 | Shane | 143—135 |
| 3,155,129 | 11/1964 | Edmunson | 143—135 |

DONALD R. SCHRAN, *Primary Examiner.*